United States Patent [19]

Srivastava et al.

[11] 4,021,848
[45] May 3, 1977

[54] ADJUSTABLE APERTURE CORRECTION SYSTEM

[75] Inventors: Gopal Krishna Srivastava, Schaumburg, Ill.; Robert Charles Wheeler, Elba, N.Y.

[73] Assignee: GTE Sylvania Incorporated, Stamford, Conn.

[22] Filed: Apr. 30, 1975

[21] Appl. No.: 573,057

Related U.S. Application Data

[63] Continuation-in-part of Ser. No. 369,968, June 14, 1973, abandoned.

[52] U.S. Cl. .............................. 358/162; 307/268
[51] Int. Cl.² .................................... H04N 5/48
[58] Field of Search .............. 178/7.5 R, DIG. 25, 178/DIG. 34; 307/260, 268, 262; 328/187, 155

[56] References Cited

UNITED STATES PATENTS

| | | | |
|---|---|---|---|
| 3,377,425 | 4/1968 | Buzan | 178/DIG. 25 |
| 3,643,011 | 2/1972 | Engel et al. | 178/DIG. 25 |
| 3,800,265 | 3/1974 | Yoshioka et al. | 307/262 X |
| 3,806,794 | 4/1974 | Vidovic | 307/262 X |
| 3,849,792 | 11/1974 | Holzrichter | 178/DIG. 25 |

FOREIGN PATENTS OR APPLICATIONS 1,447,355  6/1966  France .............................. 307/262

*Primary Examiner*—John C. Martin
*Assistant Examiner*—Mitchell Safflan
*Attorney, Agent, or Firm*—Norman J. O'Malley; Robert T. Orner; Thomas H. Buffton

[57] ABSTRACT

A signal receiver having a source of video signals includes an aperture correction system wherein an electron device coupled to the video signal source provides first and second oppositely-phased output signals which are applied to a circuit means to be differentiated and delayed respectively and applied to a summing terminal with desired preshoot and overshoot characteristics. Moreover, these characteristics are selectable by an adjustable impedance coupled to the circuit means providing the differentiated and delayed signals.

7 Claims, 5 Drawing Figures

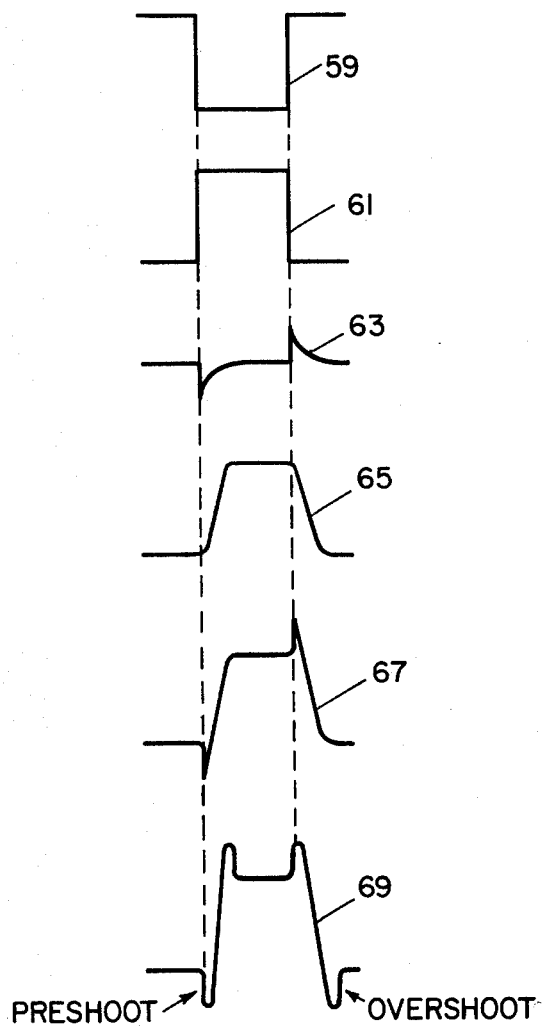
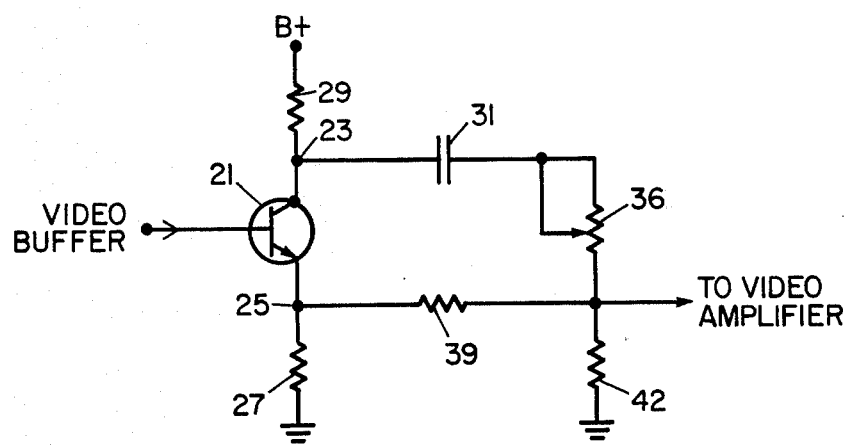

ADJUSTABLE APERTURE CORRECTION SYSTEM

CROSS REFERENCE TO OTHER APPLICATIONS

This application is a Continuation-In-Part of a copending application entitled "Adjustable Aperture Correction System" bearing U.S. Pat. Ser. No. 369,968, filed June 14, 1973 in the name of the inventors of the present application, now abandoned.

BACKGROUND OF THE INVENTION

In general, the present invention relates to signal receivers employing video amplifiers and more particularly to an aperture correction system for video amplifiers whereby the transient response of the amplifier to sudden changes in an applied signal is enhanced. It is the transient response to sudden changes in applied signals which appears to most significantly indicate the performance of a video amplifier in a signal receiver and particularly a television receiver.

In evaluating the transient response of an amplifier stage several terms related thereto are encountered. For example, rise time is usually defined as the time required for an output pulse to rise from 10 to 90 percent of its final value and is inversely proportioned to the bandwidth of the amplifier. Overshoot is the amount by which a transient rise or fall in signal exceeds its final value and is dependent upon the time-delay characteristics of the amplifier as well as the way in which amplification falls off with increasing frequency. Moreover, a preshoot condition exists when a given level of potential decreases by a given amount prior to a transient increase in potential and increases prior to a transient decrease in potential.

In the utilization of video amplifiers for television receivers it has been a common practice to employ some form of peaking circuitry. Normally, shunt peaking, series peaking, or some combination of both is employed to provide compensation for delay and amplitude decreases due to high frequency fall off of a video amplifier stage. Thus, it is not uncommon to find overshoot characteristics in the output signal of a video amplifier stage.

Although the above-mentioned peaking of the video amplifier stages does enhance the reproduction and sharpness of a visual display on a television receiver, it has been found that the reproduced visual image does leave something to be desired. More specifically, it has been found that picture reproduction is enhanced by an aperture correction system wherein preshoots as well as overshoots are simultaneously controlled.

One known aperture correction system is set forth in an article entitled "Horizontal Aperture Equalization" by A. N. Thiele which appeared in "The Radio and Electronics Engineer" Vol. 40, No. 4, Oct. 1970, pages 193–212. Therein, several relatively complex and expensive aperture correction systems are suggested. Also, a more simple correction system having fixed parameters and suitable for video frequencies is discussed.

OBJECTS AND SUMMARY OF THE INVENTION

An object of the present invention is to provide enhanced transient response in a video amplifier. Another object of the invention is to improve the visual reproduction capabilities of a television receiver. Still another object of the invention is to provide an aperture correction system for a signal receiver wherein the transient response of an amplifier stage is adjustable.

These and other and further objects, advantages and capabilities are achieved in one aspect of the invention by an aperture correction system wherein an electron device responsive to a video signal provides first and second oppositely-phased output signals which are applied to a circuit means to effect differentiation of one, delay of the other, and summation of both with an adjustable impedance coupled to the circuit means for altering the above-mentioned potentials.

BRIEF DESCRIPTION OF THE DRAWINGS

FIG. 4 illustrates waveforms showing treatment of the available signals; and

FIG. 5 illustrates still another embodiment of the invention suitable to the color television receiver of FIG. 1.

PREFERRED EMBODIMENT OF THE INVENTION

For a better understanding of the present invention, together with other and further objects, advantages and capabilities thereof, reference is made to the following disclosure and appended claims in conjunction with the accompanying drawings.

Figure 1:
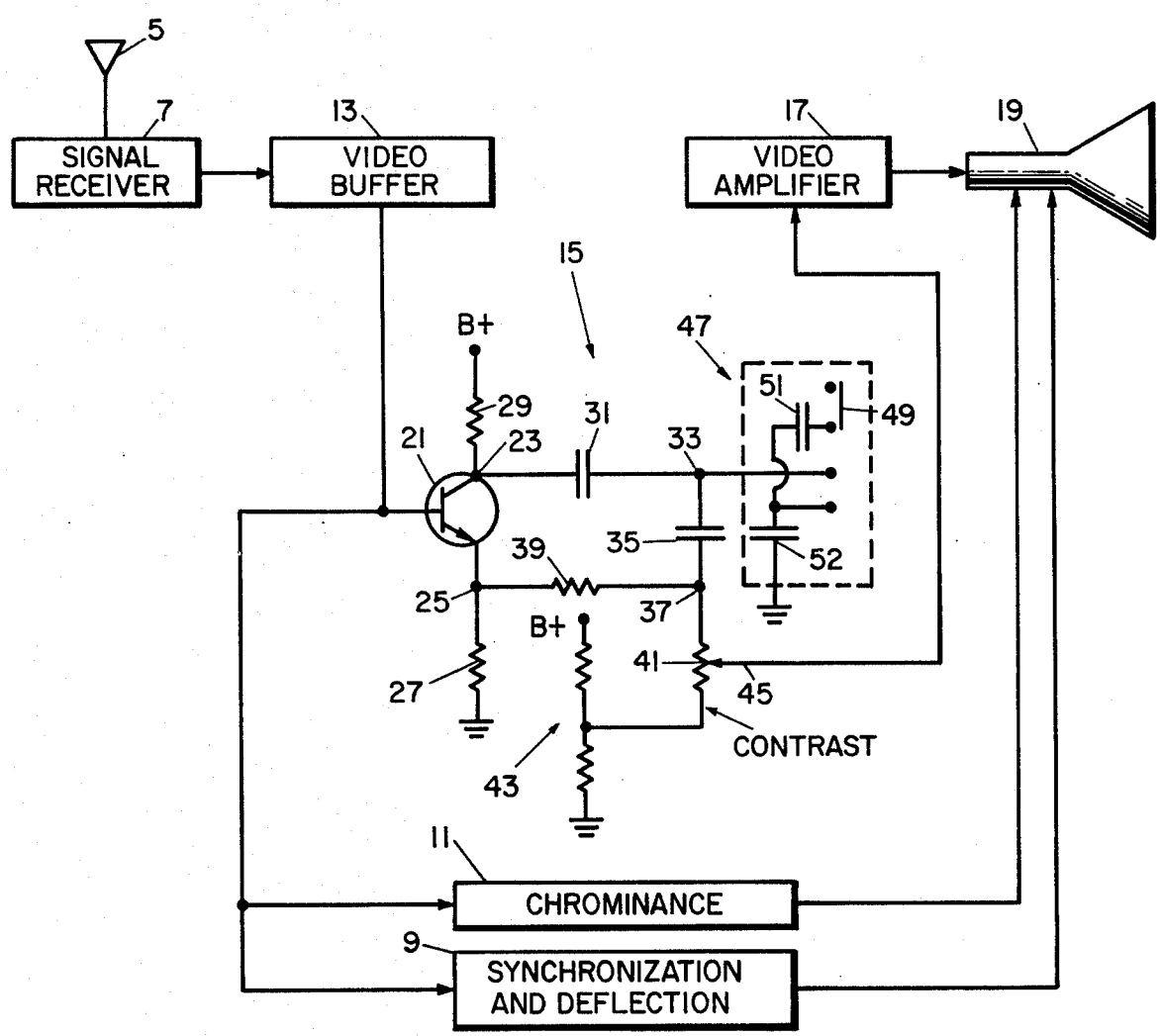
FIG. 1 is an illustration, in block and schematic form, of a color television receiver which includes an embodiment of the present invention.

In the drawings, FIG. 1 illustrates a color television receiver having an antenna 5 for intercepting and applying transmitted signals to a signal receiver 7. The signal receiver 7 includes the usual RF and IF amplifier, detector, and mixer stages and provides an output signal which is applied to a synchronization and deflection channel 9, a chrominance channel 11 and to a video buffer stage 13, which provides an output signal.

The video buffer stage 13 is coupled to a first video amplifier stage 15 which, in turn, has an output signal coupled to a second video amplifier stage 17. The second video amplifier stage 17, as well as the synchronization and deflection channel 9 and chrominance channel 11, are coupled to a color image reproducer or color picture tube 19 whereon an image display is provided.

The video amplifier stage 15 includes an electron device 21 having an input electrode or base coupled to a source of video signals in the form of the video buffer stage 13. The electron device 21 has a collector or first output terminal 23 and an emitter or second output terminal 25 which is coupled by a load circuit in the form of a resistor 27 to a potential reference level or circuit ground.

A circuit means includes a first impedance 29 in the form of a resistor coupling the first output terminal 23 to a potential source B+. A first capacitor 31 couples the first output terminal 23 to a junction terminal 33 and a second capacitor 35 couples the junction terminal 33 to a summing terminal 37. Also, a second impedance 39, in the form of a resistor in this instance although lumped or distributed delay lines are appropriate, couples the second output terminal 25 to the summing terminal 37. Moreover, the summing terminal 37 is coupled by an adjustable resistor 41 to a voltage divider 43 intermediate a potential source B+ and potential reference level with the alterable arm 45 of the adjustable resistor 41 coupled to the second video amplifier stage 17.

Figures 2, 3:
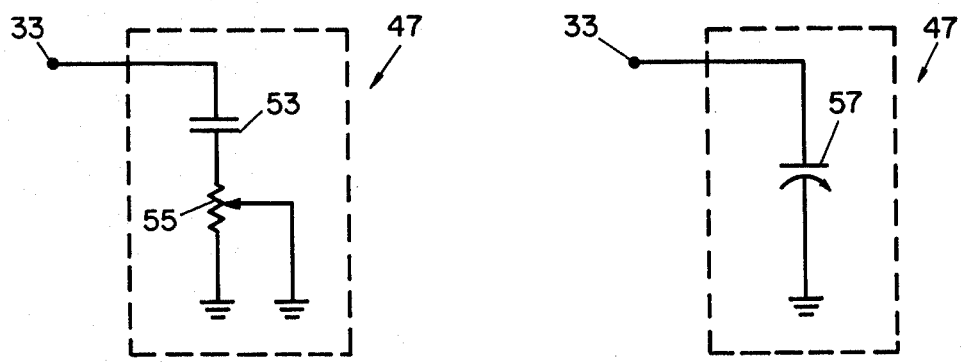
FIG. 2 illustrates an alternate to the embodiment of FIG. 1.
FIG. 3 illustrates still another alternate to the embodiment of FIG. 1.

Further, an alterable impedance means 47 includes a switching means 49 for selectively coupling first or second capacitors 51 and 52 intermediate the junction terminal 33 and the potential reference level or circuit ground. As can be seen, positional location of the switching means 49 couples none, one 52, or two capacitors 51 and 52 from the junction terminal 33 to circuit ground. FIG. 2 illustrates an alternate embodiment wherein the alterable impedance means 47 is in the form of a capacitor 53 coupled to the junction terminal 33 and to an adjustable resistor 55 connected to circuit ground. Moreover, FIG. 3 illustrates the alterable impedance means 47 in the form of a variable capacitor 57 connecting the junction terminal 33 to circuit ground.

Additionally, FIG. 5 illustrates still another alternate embodiment with parts numbered in accordance with similar parts of FIG. 1. Herein, an adjustable resistor 36 replaces the capacitor 35 and alterable impedance means 47 of FIG. 1 while an impedance 42 replaces the adjustable resistor 41 and voltage divider 43 of FIG. 1 coupling the summing terminal to circuit ground.

As to operation, reference is made to the illustrative waveforms of FIG. 4. FIG. 4 shows a video signal 59 appearing at the first output terminal 23 of the electron device 21 while 61 is the waveform of a video signal of opposite phase appearing at the second output terminal 25.

The first impedance 29, first and second capacitors 31 and 35, and second impedance 39 form a differentiating circuit for the video signal 59 appearing at the first output terminal 23 whereby a differentiated signal 63 is provided at the junction terminal 33. The first and second impedances 29 and 39 and first and second capacitors 31 and 35 form a lagging circuit network for the signal 61 appearing at the second output terminal 25 whereupon a signal having a delayed waveform 65 appears at the summing terminal 37. As a result, there is provided a summation of the two waveforms 63 and 65 at the summing terminal 37 which, in turn, has a waveform 67 illustrated in FIG. 4.

Further, the adjustable impedance 47 may be employed to simultaneously provide adjustments or alterations in both the delayed and differentiated signals whereby the preshoot conditions and subsequent overshoot conditions waveform 69 are varied. Moreover, the adjustable resistor 36 is similarly suitable for simultaneously providing adjustment in both the delayed and differentiated signals whereby preshoot and overshoot conditions are varied.

As an example, but in no way limiting the invention, the following component values are applicable to one embodiment of the invention:

R29 — 1 K
R39 — 470
R27 — 470
C31 — 220 Pf
C35 — 820 Pf
C51 — 220 Pf
C52 — 470 Pf

Thus, there has been provided an aperture correction system for a signal receiver wherein transient conditions of a video signal are readily altered. Not only are the overshoot conditions controlled but, in addition, preshoot conditions are simultaneously controlled and selectively adjustable. In this manner sharpness and picture reproduction capabilities are enhanced.

While there has been shown and described what is at present considered the preferred embodiments of the present invention, it will be obvious to those skilled in the art that various changes and modifications may be made therein without departing from the invention as defined by the appended claims.

What is claimed is:
1. In a signal receiver having a video signal source, an aperture correction system comprising:
an electron device having a signal input terminal and first and second signal output terminals, said signal input terminal coupled to said video signal source and said first and second signal output terminals providing oppositely phased output signals; and
circuit means having a summing terminal coupled by an adjustable impedance to a potential reference level and means for adjustably differentiating and coupling a signal of one phase appearing at said first signal output terminal to said summing terminal and for adjustably delaying and coupling a signal of a phase opposite to said one phase appearing at said second signal output terminal to said summing terminal whereby preshoot and overshoot characteristics of a signal at said summing terminal are alterable by said adjustable impedance.

2. The aperture correction system of claim 1 wherein said circuit means includes a first impedance coupling said first signal output terminal to a potential source, a capacitor coupled to said first signal output terminal, an adjustable impedance means coupling said capacitor to said summing terminal, a second impedance coupling said summing terminal to said second signal output terminal, and a third impedance coupling said summing terminal to a potential reference.

3. The aperture correction system of claim 2 wherein said adjustable impedance is in the form of an adjustable resistor.

4. The aperture correction system of claim 2 wherein said adjustable impedance is in the form of a second capacitor connected to said capacitor with the junction thereof coupled by selectively added capacitors to a potential reference level.

5. The aperture correction system of claim 2 wherein said adjustable impedance is in the form of a fixed capacitor with an adjustable capacitor coupling the junction of said capacitor and said fixed capacitor to a potential reference level.

6. The aperture correction system of claim 2 wherein said adjustable impedance is in the form of a second capacitor coupling said capacitor to said summing terminal and a series connected third capacitor and adjustable resistor coupling the junction of said capacitor and second capacitor to a potential reference level.

7. An aperture correction system for a signal receiver having a source of video signals comprising:
a transistor having a signal input terminal connected to said source of video signals and first and second signal output terminals providing output signals of opposite phase; and
circuit means having a first impedance coupling said first signal output terminal to a potential source, a capacitor coupled to said first signal output terminal, an adjustable impedance in the form of an alterable resistor coupling said capacitor to a summing terminal, a second impedance coupling said summing terminal to said second signal output terminal, a third impedance coupling said second signal output terminal to a potential reference level, and a fourth impedance coupling said summing terminal to said potential reference level.

* * * * *